United States Patent

[11] 3,604,288

| [72] | Inventor | Yoichi Mori |
| | | Yokohama, Japan |
| [21] | Appl. No. | 872,308 |
| [22] | Filed | Oct. 29, 1969 |
| [45] | Patented | Sept. 14, 1971 |
| [73] | Assignee | Nissan Motor Company, Limited |
| | | Yokohama, Japan |
| [32] | Priority | Oct. 30, 1968 |
| [33] | | Japan |
| [31] | | 43/78831 |

[54] ELECTRONIC CONTROL SYSTEM FOR AUTOMOTIVE AUTOMATIC TRANSMISSION
12 Claims, 19 Drawing Figs.

[52] U.S. Cl. .................................... 74/864,
74/866, 94/752, 74/731
[51] Int. Cl. ........................................ B60k 21/08,
F16h 5/42
[50] Field of Search .......................... 74/336,
365, 731, 752, 866, 864

[56] References Cited
UNITED STATES PATENTS

| 3,019,666 | 2/1962 | Brennan et al. | 74/866 |
| 3,122,940 | 3/1964 | Shimwell et al. | 74/866 |
| 3,267,762 | 8/1966 | Reval | 74/866 X |
| 3,420,328 | 1/1969 | Johnson et al. | 74/731 |
| 3,433,101 | 3/1969 | Scholl et al. | 74/866 |
| 3,448,640 | 6/1969 | Nelson | 74/866 |

Primary Examiner—Arthur T. McKeon
Attorney—John Lezdey

ABSTRACT: A system for electronically controlling the line pressure in the hydraulic control circuit of an automatic transmission of an automotive vehicle, which pressure is changed with a voltage proportional to the engine torque or inversely proportional to the speed of the turbine shaft of a torque converter.

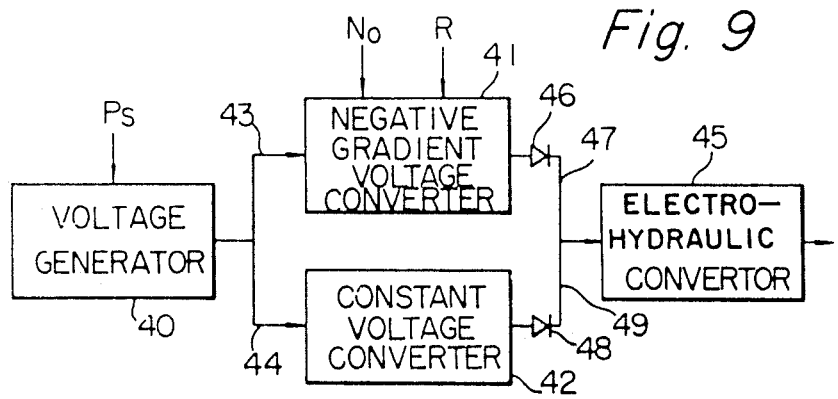
Fig. 9
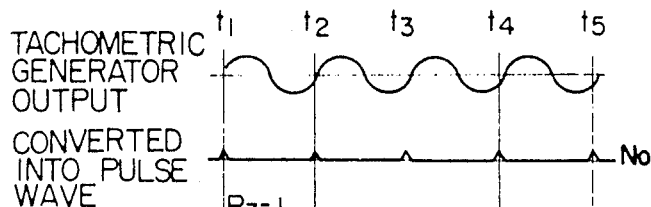
Fig. 11
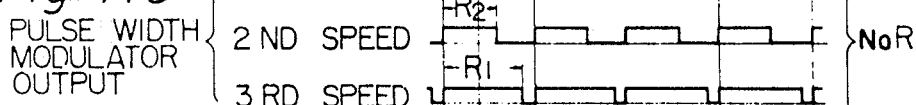
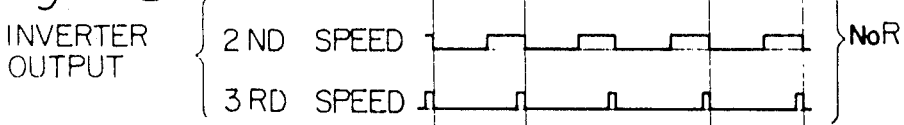
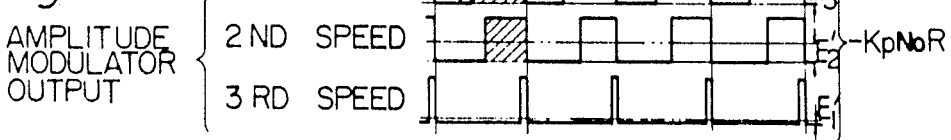

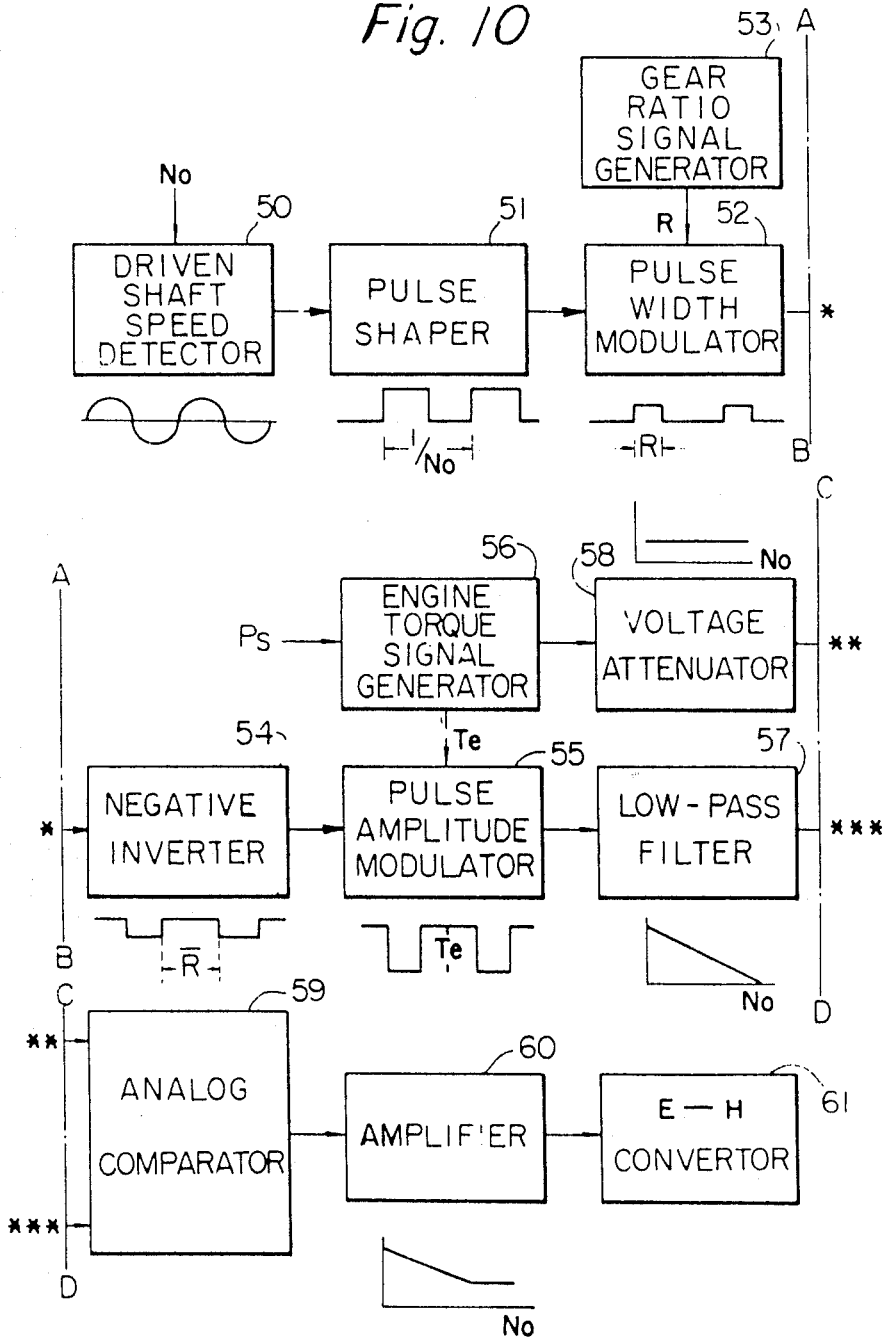

3,604,288

ELECTRONIC CONTROL SYSTEM FOR AUTOMOTIVE AUTOMATIC TRANSMISSION

This invention relates to a system for electronically controlling line pressure in the hydraulic control circuit of an automatic transmission, and more particularly to a control system for regulating the line pressure in response to the speed of the turbine shaft of a torque converter.

In an automatic transmission, if an excessively high hydraulic control pressure is applied to the friction engaging mechanism the mechanism is caused to engage abruptly to invite undue mechanical shocks while, if an excessively low pressure is applied the mechanism is coupled slowly to invite frictional heat.

The line pressure for controlling the hydraulic circuit must be therefore appropriate to effect the coupling of the friction engaging mechanism and its should preferably be proportional to the torque of the turbine shaft of the torque converter. This torque is derived as the product of the engine torque and the torque ratio of the torque converter. The torque ration in turn is derived from the ratio between the turbine shaft speed and pump speed of the torque converter. These factors are automatically obtained and evaluated in the electronic control system according to this invention, and are thereafter converted into hydraulic signals.

The present invention thus provides a novel and improved system for electronically controlling the line pressure in the hydraulic circuit of an automatic transmission in relation to the speed of the turbine shaft of a torque converter.

The features and advantages of the present invention will become apparent from the following description taken in conjunction with the accompanying drawings, in which:

FIG. 1 is a diagrammatic view of an automotive transmission embodying the present invention;

FIGS. 2 to 8 are graphical representations of the relationship between the torque ratio vs. speed ratio; turbine torque vs. turbine speed; line pressure vs. speed ratio; line pressure vs. turbine speed; turbine torque vs. turbine speed in another condition; and output shaft torque vs. output shaft speed in the first, second, third speeds, respectively; and line pressure vs. turbine shaft speed in another condition;

FIG. 9 is a block diagram of the electronic control system according to the present invention;

FIG. 10 is a schematic diagram of an embodiment of the system shown in FIG. 9;

Figure 12:
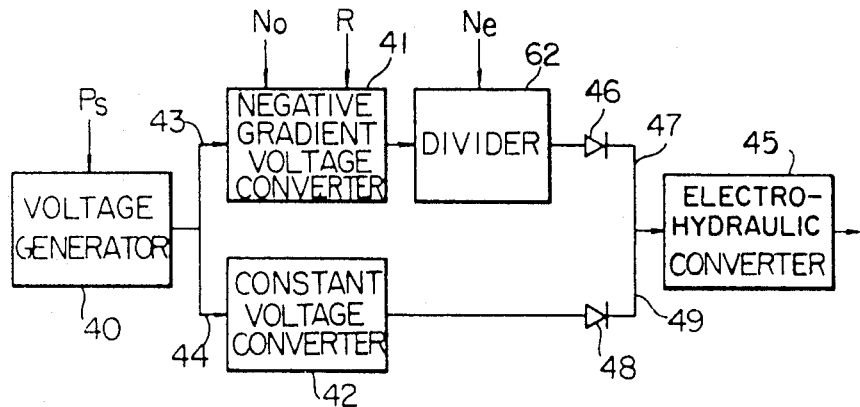
Figure 13:
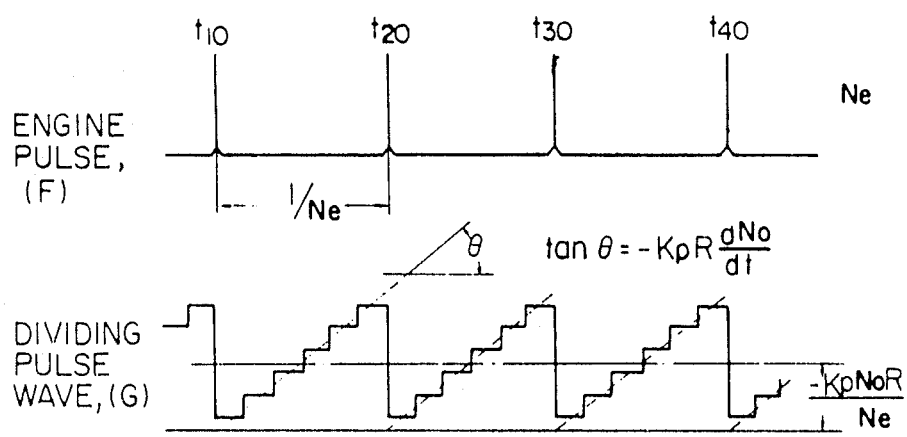
Figure 14:
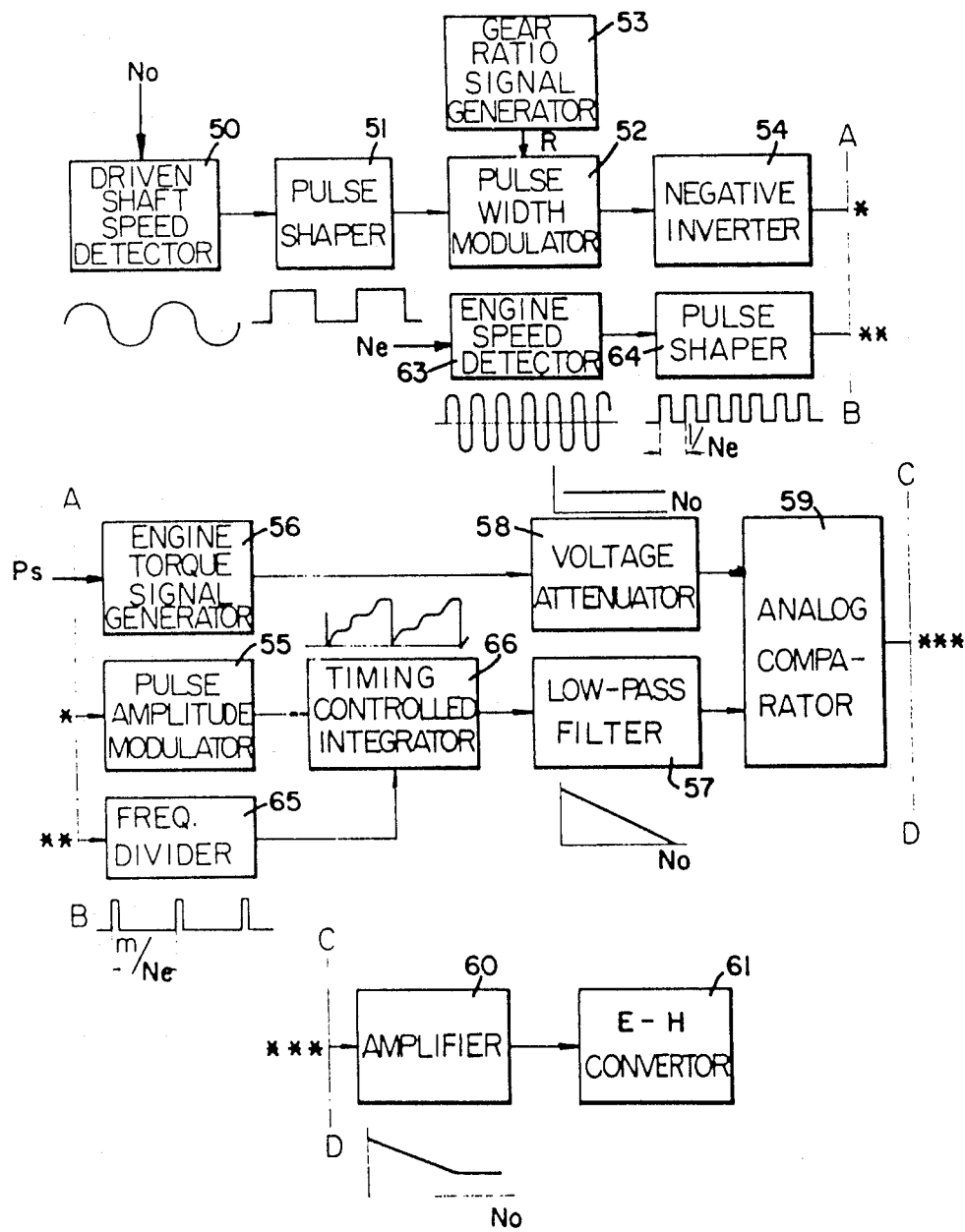

Fig. 11 consisting of FIGS. 11A through 11E are wave forms at several points in the circuit shown in FIG. 10, wherein FIG. 11A shows the wave form of the output of the tachometric generator, FIG. 11B the wave form of the output of the differentiator, FIG. 11C the wave forms for the first, second and third speeds of the output of the flip-flop, FIG. 11D the wave forms for the first, second and third speeds of the output of the sign inverter, and FIG. 11E the wave forms of the output of the amplitude varying means;

FIG. 12 is a block diagram of another embodiment of the system according to the present invention;

FIG. 13 is wave forms of the electric current as used where the system of this invention is to be controlled depending upon the speed ratio of the torque converter; and FIG. 14 is a block diagram showing a modification of the embodiment of FIG. 10.

Figure 1:
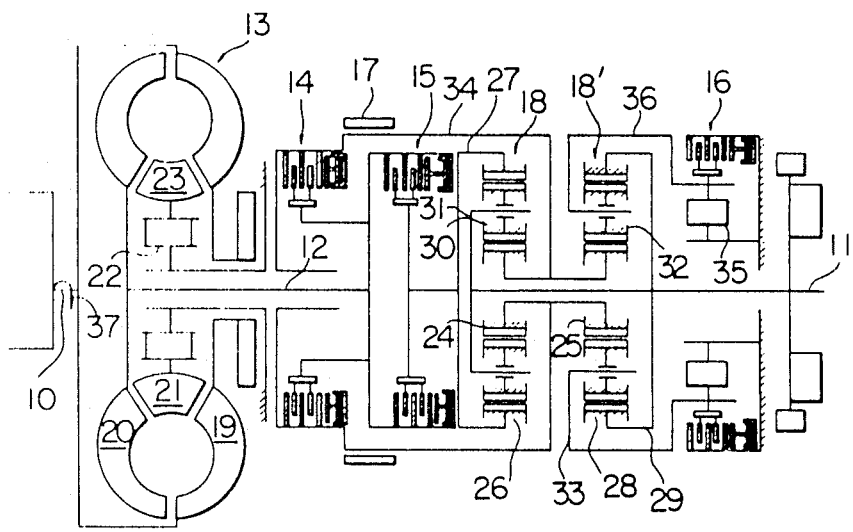

Referring now to FIG. 1, the transmission comprises a drive shaft 10, driven shaft 11 and intermediate shaft 12. The drive shaft 10 may be the usual crankshaft of the vehicle engine, and the driven shaft 11 may be connected by any suitable means. The shafts 10, 11 and 12 are rotatably mounted with respect to the transmission housing (not shown) and the shaft 12 is driven with respect to the shafts 10 and 11. The transmission further comprises a hydraulic torque converter 13, hydraulically operated friction clutches 14 and 15, hydraulically operated friction brakes 16 and 17 and first and second planetary gear sets 18 and 18'.

The hydraulic torque converter 13 comprises a vaned impeller element 19, vaned rotor or driven element 20 and a vaned stator or reaction element 21. The vaned elements 19, 20 and 21 are mounted within a fluidtight casing (not shown), part of which is formed by the casing (not shown) of the impeller 19. The impeller is driven from the drive shaft 10. The rotor 20 is rotatably mounted with respect to the transmission casing (not shown). A one-way brake 22 is provided between the stator 21 and the transmission casing (not shown). The one-way brake 22 may be of any suitable construction and is so arranged as to allow a free rotation of the stator 21 in the forward direction, that is, in the direction in which the drive shaft 10 rotates and prevents the rotation of the stator 21 in the reverse direction.

The torque converter 13 operates in a manner well known and it drives the rotor or driven element 11 at a torque greater than the torque impressed on the impeller 19 of the converter by the engine. The vanes of the stator 21 serve to change the direction of flow of fluid between the rotor and impeller. Here, the reaction of the stator 21 takes place in the direction reverse to the rotation of the drive shaft 10, so that the one-way brake 22 prevents the rotation of the stator 21 in this direction. When the speed of the driven element or rotor 20 reaches a predetermined lever, the direction of the reaction on the vanes of the stator 21 is altered so that the stator 21 tends to turn in the forward direction. The brake 22 acts to allow such rotation of the stator 21, in which instance the torque converter 13 functions as a simple fluid coupling to drive the rotor 20 at substantially the same speed and without increase in torque.

The first and second planetary gear sets 18 and 18', respectively, comprise a sun gear 24 formed on the driven shaft 11, a second sun gear 25 integral with the sun gear 24, a ring gear formed on a bell-shaped portion 27 connected through the clutch 15 with the intermediate shaft 12, a second ring gear 28 formed on a bell-shaped portion 29 of the driven shaft 11, a plurality of planet gears 30 each of which is rotatably mounted in the planet gear carrier 31 connected to the driven shaft 11, a plurality of second planet gears 32 each of which is rotatably disposed in the planet gear carrier 33 which is connected through the brake 16 to the transmission housing (not shown). The planet gears 30 are in mesh with the sun gear 24 and with the ring gear 26. The planet gears 32 are in mesh with the sun gear 25 and with the ring gear 28.

The transmission also comprises a connecting drum 34 which is connected at its rear end to the sun gear 24 and 25 and at the front end through the clutch 14 to the intermediate shaft 12. A one-way brake 35 is disposed between a bell-shaped portion 36 connected to the carrier 33 and the transmission housing.

The clutch or front clutch 14 is arranged to connect the intermediate or turbine shaft 12 driven by the rotor 20 through the connecting drum 34 with the sun gear 24 and 25 formed on the driven shaft 11.

The clutch or rear clutch 15 is so arranged as to connect the intermediate shaft 12 and rotor 20 with the ring gear 26 of the first planetary gear set 18. The low-and-reverse brake 16 is arranged to connect the carrier 33 through the bell shaped portion 36 with the transmission housing. The brake 17 is adapted to brake the connecting drum 34. The one-way brake 35 may be of any suitable construction and is so arranged as to allow a free rotation of the carrier 33 connected with the bell-shaped portion 36 in the forward direction, that is, in the direction in which the drive shaft 10 rotates and to prevent the rotation of the carrier 33 in the reverse direction.

In operation, the transmission has a neutral condition and provides low, intermediate and high speed ratios in forward drive and a drive in reverse. As indicated in the following table I, when the transmission is in the neutral condition, the front and reverse clutches 14 and 15, brake 17, low-and-reverse brake 16, and one-way brake 35 are all disengaged. The first range speed ratio power train is completed by engaging the rear clutch 15 and the low-and-reverse brake 16, in which stance the reduction ratio $R_1$ is equal to 2.46 The low-speed ratio in a drive range is completed by engaging the rear clutch 15 and one-way brake 35, in which instance the reduction ratio $R_1$ is invariably equal to 2.46 The intermediate speed ratio in the drive range is completed by engaging the rear clutch 15 and brake 17, when the reduction ratio $R_2$ is equal to 1.46 The high speed ratio in the drive range is completed by engaging the front and rear clutches 14 and 15, when the reduction ratio $R_3$ is equal to 1.00. The reverse speed ratio is completed by engaging the front clutch 14 and low-and-reverse brake 16, when the reduction ratio $R_{rev}$ is equal to 2.18 clutches 14 and 15, respectively, allowing the brake 17 to be released. In this conditions, the intermediate shaft 12 is connected through the front clutch 14 and sun gears 24 and 25 to the output shaft 11, in which instance the reduction ratio R equal to 1.00 is established between the intermediate and output shaft speed.

The low or first range speed ratio power train through the transmission is built up by engaging the rear clutch 15 and low-and-reverse brake 16, allowing the brake 17 to be released. The low-and-reverse brake 16 serves to produce a reaction torque, the sum of which torque and the torque transmitted to the ring gear 26 of the first planetary gear set 18 is transmitted to the output shaft 11 of the vehicle

TABLE 1

| Shifting area | Front clutch | Rear clutch | Second brake | Low & rev. brake | One-way brake | Reduction ratio |
|---|---|---|---|---|---|---|
| 1 | | 0 | | 0 | | $R_1$=2.46 |
| D1 | | 0 | | | (*) | $R_1$=2.46 |
| D2 | | 0 | ll | | | $R_2$=1.46 |
| D3 | 0 | 0 | | | | $R_3$=1.00 |
| R | 0 | | | 0 | | $R_{rev}$=2.18 |
| N | | | | | | |

Where is footnote to reference mark—?

Symbol "0" indicates that the friction elements are actuated by hydraulic pressure; "*" that the elements are actuated spontaneously by the reaction; "I" a condition in which the engine braking can be applied in a low-speed range; "D1, D2 and D3" the first or low speed, the second or intermediate speed and the third or high-speed ratio in the drive range; and "R" the drive in reverse.

When the vehicle is started at a low-speed range ratio, there takes place a slip between the impeller 19 and rotor 20 of the torque converter 13, and the rotor 20 is driven with torque greater than the torque on the impeller 19 so that both the hydraulic torque converter 13 and the planetary gear sets 18 and 18', which are connected in series, multiply the torque between the drive shaft 10 and driven shaft 11. Under these conditions, the one-way brake 22 acts to hold the stator 21 at rest. The hydraulic torque converter 13 permits the vehicle to start gradually. The vehicle being thus started, the driven element 20 of the converter 13 is rotating at a certain speed. The one-way brake 22 is released and the stator 21 starts to rotate in the forward direction. The converter 13 now acts as a simple fluid coupling to provide no increase in the torque. In this low-speed range, the transmission cannot be shifted to a higher speed range but it is fixed at only the low-speed ratio.

In the drive range, when the vehicle is started, it is also automatically shifted to a higher speed ratio at a predetermined vehicle speed as will be described hereinafter The only difference between the low-speed ratios in the low and drive ranges in that the low-speed forward drive through the transmission in low range is at all times available but is effected either when a greater torque is required to drive the vehicle or for engine braking purposes. The low speed forward drive through the transmission in drive range, on the other, is intended to automatically control the shifting of the speed ratio, in which instance the one-way brake 35 acts to hold the carrier 33 of the second planetary gear set 18' at rest to produce a reaction torque Thus, the reduction ratio $R_1$ which is equal to 2.46 is established between the intermediate shaft speed and the output.

The intermediate speed ratio power train through the transmission is built up by engaging the rear clutch 15 and brake 17 The brake 17 serves to hold the connecting drum 34 stationary and the one-way brake 35 is released to rotate freely. The sum of the torque transmitted from the engine through the torque converter 13, intermediate shaft 12 and rear clutch 15 to the ring gear 26 of the first planetary gear set 18 and the reaction torque produced at the brake 17 is transmitted to the output shaft 11 Thus, the reduction ratio $R_2$ of 1.46 is established between the intermediate shaft speed and output speed.

The high-speed ratio power train through the transmission, which constitutes a direct drive between the drive shaft 10 and driven shaft 11, is built up by engaging the front and rear Reverse drive is built up in the transmission by engaging the front and low-and-reverse brakes 14 and 16, respectively. For this drive, the power train is transferred from the drive shaft 10 through the torque converter 13 to the intermediate shaft 12 and thence through the front clutch 14 to the sun gear 25 of the second planetary gear set 18' On the other hand, the low-and-reverse brake 16 produces reaction torque in the reverse direction. Thus, the difference between the torque transmitted to the sun gear 25 of the second planetary gear set 18' and the reaction torque produced at the low-and-reverse brake 35 is transmitted to the output shaft 11 of the vehicle. In this reverse drive, the reduction ratio is 2.18.

Figure 2:
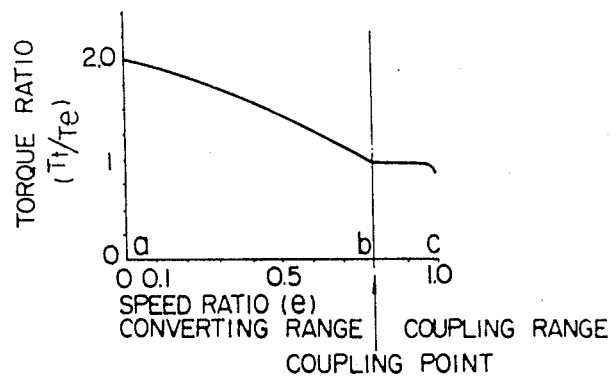

Reference is now made to FIGS. 2, 3, 4 and 5. In the power train of automotive engine, the torque $T_e$ produced at the engine is increased by the torque converter to $T_t$, which is equal to the product of the torque ratio $\tau$ and engine torque. This increased torque $T_t$ is transmitted through the output of the torque converter or turbine shaft to the clutch 14 or 15. The torque is further increased at the planetary gear sets so as to multiply the reduction ratio R The torque transmitted to the output shaft of the vehicle in thus equal to $T_o$, which, in turn, is equal to the product of the reduction ratio R and the torque $T_t$ at the turbine shaft In this instance the torque ratio $\tau$ varies according to the change of the speed ratio $e$ of the torque converter as illustrated in FIG 2, in which when the speed ratio $e$ is equal to zero the torque ratio is approximately 2 as indicated at point $a$ As the ratio $e$ increases to 0.8, the ratio $\tau$ becomes approximately 1 as indicated at point $b$. The ratio $\tau$ is kept unchanged and is maintained at 1 as denoted, when the ratio $e$ increases beyond the point $b$ As the ratio $e$ approaches 1, the ratio $\tau$ abruptly falls down as indicated at point $c$. Thus, the range from zero to the coupling point of the speed ratio $(a-b)$ is usually named a conversion range and the range from the coupling point to 1 ($b$-cnamed a coupling range.

Since the curve of the torque ratio vs. speed ratio is generally straight as observed in FIG 2, it may be accepted to deem the curve as a perfect straight line for all practical purposes of controlling the automatic transmission.

It is noted that the hydraulic pressure or line pressure in the control circuit of the transmission should vary in proportion to the change in the turbine torque $T_t$, or more precisely, to the product of the engine torque $T_e$ and torque ratio $\tau$. This is exemplified in FIG 3.

Figure 3:
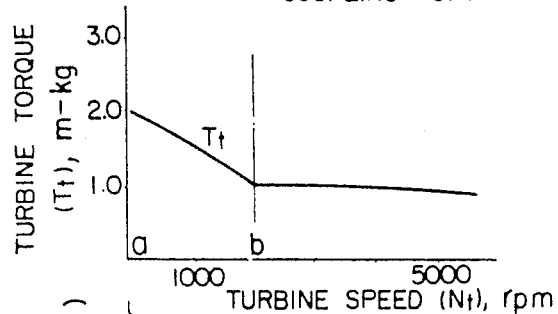
Figure 4:
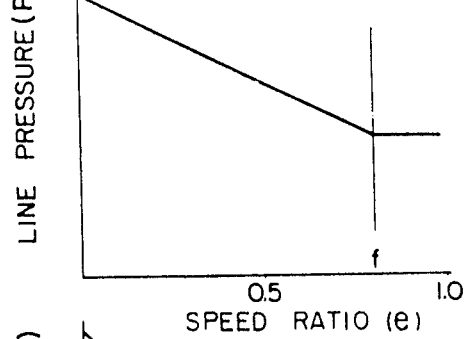
Figure 5:
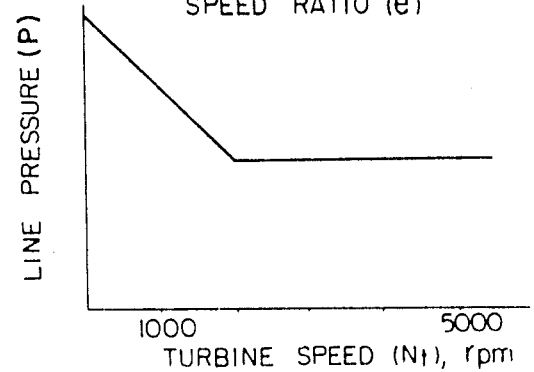
Figure 6:
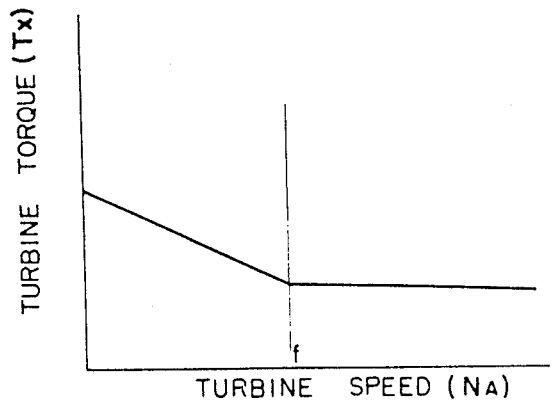

Reference to FIG. 6, the point $f$ of the turbine shaft speed stands for the coupling point corresponding to point $b$ in FIG 2. The point $f$ is a constant which is determined by the position of the throttle valve of the engine The point $f$ may be, for instance, three-fourth as seen in FIG. 4. In FIG. 3, the curve is shown to have a characteristics that, if the speed $N_t$ is zero, the torque $T_t$ is approximately 2.0. As the speed $N_t$ increases, the torque $T_t$ continues to decrease until the speed $N_t$ reaches the coupling point, which is, for example, approximately 1.0. Event though the speed $N_t$ further increases beyond the coupling point, the torque $T_t$ is kept constant up to maximum turbine speed. The curve of FIG 3 may well be deemed as a straight line as shown in FIG. 5.

Figure 7:
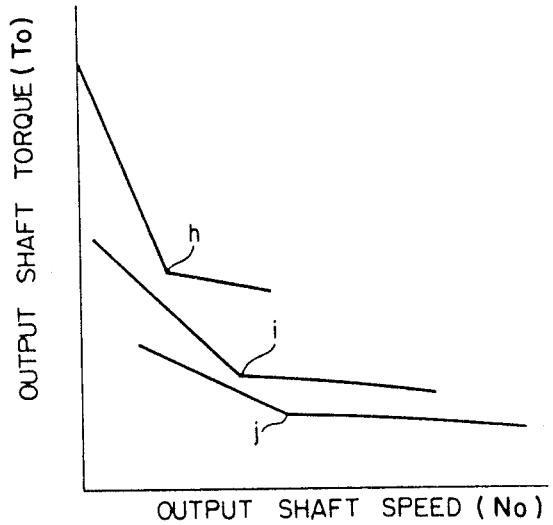

FIG. 7 illustrates the relationships between the output shaft torque and speed at the first, second and third speeds when the throttle valve is held in a fixed position. Here, the individual curves stand for different reduction ratio. The reduction ratio in the first speed as indicated by the curve $h$ is higher than those in the second and third speeds indicated by the curves $i$ and $j$, respectively.

Figure 8:
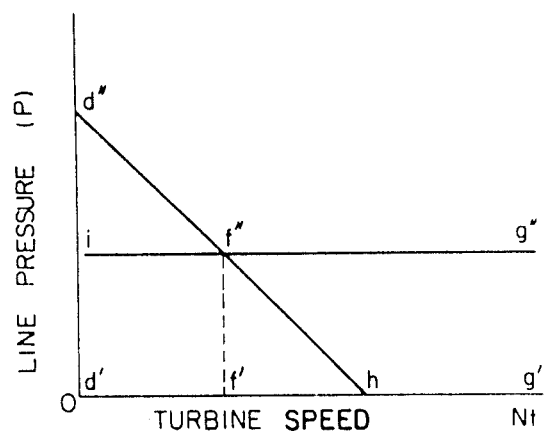

FIG. 8 shows the relationship between the line pressure and turbine speed at a given engine torque. The line pressure P should preferably be varied in accordance with a curve $d''\text{-}f'\text{-}g$ In the speed range of the turbine shaft of the torque converter from the point $d'$ to $f'$, the line pressure should preferably be controlled in accordance with the curve $d''\text{-}f'$. The line pressure thus decreases as the turbine shaft speed $N_t$ decreases. The intersecting point of the extension of the curve $d''\text{-}f'$ and the abscissa $o\text{-}g'$ is indicated at point $h$. In the speed range of the turbine shaft from the point $f'$ to $g'$, the line pressure should preferably be controlled in accordance with the curve $f'\text{-}g''$ which remains constant independently of the turbine shaft speed.

Referring now to FIG. 9, the electronic control system according to the present invention has a voltage generator 40 generating a voltage proportional to the engine torque $T_e$, which voltage is derived from a vacuum gauge (not shown) mounted in an intake manifold of the vehicle engine. A negative gradient voltage converter 41 converts the output of the voltage generator 40 into a voltage inversely proportional to the speed of the turbine shaft of the torque converter in accordance the curve $d''\text{-}h$ in FIG. 8. A constant voltage converter 42 converts the output of the voltage generator 40 into a constant voltage dictated by the characteristics of the torque converter in accordance with the curve $i\text{-}g''$ in FIG 8 to correspond to $d\text{-}i\text{-}d'\text{-}d''$ of the characteristics of the torque converter. The negative gradient voltage converter 41 is connected with the voltage generator 40 through a line 43 and the constant voltage converter 42 with the voltage generator 40 through a line 44 to receive a voltage proportional to the torque of the engine. An electrohydraulic converter 45 is provided for converting the output voltage from either the negative gradient voltage converter 41 or the constant voltage converter 42 into a hydraulic pressure. The output of the negative gradient voltage converter 41 is connected through a diode 46 and line 47 with the electrohydraulic converter 45 only when the output voltage from the voltage converter 41 is higher than the voltage from the constant voltage converter 42. The output of the constant voltage converter 42 is connected through a diode 48 and line 49 with the electrohydraulic converter 43 only when the output from the constant voltage converter 42 is higher than the voltage from the negative gradient voltage converter 41.

The voltage generator 40 generates a voltage proportional to the engine torque in such a manner that the signal produced from the aforesaid vacuum gauge (not shown) is compared in absolute value with the signal produced when the engine torque is none.

In operation, the turbine speed $N_t$ is calculated at the negative gradient voltage generator 41 like this: the driven shaft speed $N_o$ is multiplied by the speed reduction ratio $R$; and the negative gradient voltage corresponding to the line pressure for the turbine speed $N_t$ is derived therefrom, while the constant voltage converter 42 produces a constant voltage proportional to the engine torque independently of the turbine speed.

More specific embodiment of this invention is illustrated in FIG. 10. As shown, a driven shaft speed detector 50 (which may actually be a tachometric generator and mounted on the output shaft of the transmission) detects the speed transmitted to the propeller shaft of the vehicle and produces a signal with a voltage corresponding to the driven speed. This signal voltage is considered a sinusoidal wave insofar as the driven shaft speed detector 50 is a tachometric generator. The output voltage in the sinusoidal wave form is then introduced into a pulse shaper 51 for conversion into a square wave with the wave length of $1/n_o$. The pulse shaper 51 is connected to a pulse width modulator 52 which, in turn, is connected to a gear ratio signal generator 53 generating a signal representing the gear ratio selected from time to time. The pulse width modulator 52 serves to determine the width of the output pulse from the pulse shaper 51 in cooperation with the gear ratio signal generator 53 The pulse shaper 51 may be, if desired, replaced with a Schmitt circuit. The width of the pulse produced from the modulator 52 is rendered proportional to the gear ratio R. The pulse width modulator 52 is connected with a negative inverter 54 at which the output pulse from the pulse width modulator 52 is inverted into a pulse with the width of $\overline{R}$. The negative inverter 54 is connected to a pulse amplitude modulator 55 to which is connected an engine torque signal generator 56. The engine torque signal generator 56 provides the pulse amplitude modulator 55 with a signal substantially corresponding to the engine torque at any given time. In this instance, as previously discussed, the engine torque is approximated from vacuum level in the intake manifold (not shown) of the engine. Thus, the output pulse delivered from the pulse amplitude modulator 55 has an amplitude corresponding to the engine torque $\tau_e$. The pulse thus produced from the pulse amplitude modulator 55 is then fed to a low-pass filter 57 and is thereby rectified into a DC voltage. The engine torque signal generator 56 is, on the other hand, connected to a voltage attenuator 58, whereby the voltage proportional to the engine torque $\tau_e$ is rendered into a constant voltage lower than the input voltage. The low-pass filter 57 and voltage attenuator 58 are connected with an analogy comparator 59. The voltages derived from the low-pass filter and attenuator 57 and 58, respectively, are compared with each other at the comparator 59 and the higher voltage is then amplified at the amplifier 60 connected with the comparator 59. The wave form of the voltage thus passed through the amplifier 60 is in analogy with the curve of FIG. 3. The output of the amplifier 60 is applied to an electrohydraulic converter 61 producing a signal to control the line pressure supplied to the hydraulic control circuit of the transmission The wave forms appearing at the elements of the above-described circuit arrangement are illustrated in FIG. 11.

FIG. 12 is a block diagram showing a modification of the system shown in FIG 9. As shown, a voltage divider 62 is inserted additionally between the negative gradient voltage converter 41 and diode 46. This voltage divider 62 is intended to provide a signal representing the speed ratio $e$. The voltage divider 62 receives pulses with the repetition frequency proportional to the engine speed preferably from an ignition coil of the engine ignition system, although not shown in the drawing If desired, the pulse fed to the divider 62 may be derived from an AC generator driven by the vehicle engine. The divider 62 also receives a signal from the negative gradient voltage converter 41 and both the engine speed signal and the signal from the converter 41 are converted into pulses as illustrated in FIG. 13. The pulse F in this figure is proportional to the engine speed with their intervals proportioned to the reciprocal $1/n_e$ of the engine speed The voltage fed from the negative gradient voltage converter 41 is accumulated until it is discharged when the pulse F is introduced into the converter 41, thus providing a wave form G. In this instance, the voltage is accumulated in the negative gradient voltage converter 41 in a stepwise form and is discharged at the time intervals of $t_{10}$, $t_{20}$, $t_{30}$, ... so that the dividing pulse G macroscopically appears to be a square wave pulse. This means that the mean value of the voltage G is $-kp \cdot n_0 \cdot R/n_e$. The voltage having such mean level is introduced into the hydroelectric converter 45 The constant gradient voltage converter 42, on the other hand, acts entirely similarly to the counterpart shown in FIG. 9. Thus, the modified form of the control system provides a reasonable electronic control of the hydraulic control system of the transmission, because the signal supplied from the hydroelectric converter is closely related to not only the turbine torque of the torque converter but the engine speed at any given time A more specific embodiment of the system shown in FIG. 12 is illustrated in FIG. 14 by way of example.

As illustrated, the circuit arrangement of this modified control system is generally similar to the arrangement of FIG. 10 except for the provision of an engine speed detector 64 and the associated elements connected with the low-pass filter 57.

The engine speed detector 63 may actually be a tachometric generator mounted, for instance, on the crankshaft of the vehicle engine. The engine speed detector 63 is connected to a pulse shaper 64 so as to convert the sinusoidal wave from the detector 63 into a square wave with wave length corresponding to $1/n_r$. The pulse shaper 64, in turn, is connected to a counter or frequency divider 65 at which the output from the pulse shaper 64 is converted into a pulse with the pulse width of $m/n_r$ by means of an $m$-digit circuit in the frequency divider 65. The resultant pulse is introduced into a timing controlled integrator 66 at which the pulse is integrated. The pulse so integrated is fed to the low-pass filter 57 and converted into a DC voltage, as previously discussed in connection with the embodiment shown in FIG. 10.

I claim:

1. In an automatic transmission of an automotive vehicle including an engine of internal combustion type and a hydraulic control system having therein a line pressure for selectively actuating friction elements of the transmission to effect shiftings of the transmission between a plurality of gear ratios, a voltage generator, and electronic control system for controlling a pressure level of the line pressure in dependence upon variable characteristics of torque transmitted from the engine to the transmission, said electronic control system comprising:

engine torque detecting means connected to an intake manifold vacuum for generating an engine torque signal having a magnitude proportional to an engine torque;

transmission output speed detecting means mounted on the transmission output shaft for detection of a revolutional speed of the transmission output shaft for generating a transmission output speed signal having a period proportional to a transmission output speed;

gear ratio detecting means mounted for detection of a gear ratio, into which the transmission is to be shifted, for generating a gear ratio signal having a magnitude proportional to the gear ratio;

electrohydraulic converting means for controlling the pressure level of said line pressure in dependence upon a level of voltage supplied thereto;

negative gradient voltage converting means connected at one end with the voltage generator and at the other end to said electrohydraulic converting means receptive of said engine torque, transmission output speed and gear ratio signals for generating an output voltage having a magnitude inversely proportional to said transmission output speed;

constant voltage converting means receptive of said engine torque signal connected at one end with said voltage generator and at the other end to said electrohydraulic converting means for generating a constant voltage having a magnitude determined by the voltage level of said engine torque signal; and comparating means receptive of said output voltages of said negative gradient and constant voltage converting means for selectively passing therethrough one of said two input voltages to said electrohydraulic converting means.

2. An electronic control system according to claim 1, wherein said comparating means is connected for comparing said output voltages of said negative gradient and constant voltage converting means and passes therethrough the lower output voltage of said two output voltages when said electrohydraulic converting means has such a positive characteristic as the pressure level of said line pressure produced therein is increased in proportion to the increase of the level of the voltage supplied thereto.

3. An electronic control system according to claim 2, wherein said negative gradient voltage converting means includes:

a pulse shaper receptive of said transmission output speed signal for producing a shaped pulse of square wave having a period proportional to said transmission output speed, a pulse width modulator connected with said pulse shaper and a gear ratio signal generator receptive of said shaped pulse and gear ratio signal for producing a width modulated pulse having a width proportional to said gear ratio, a pulse amplitude modulator connected for reception of said width modulated pulse and engine torque signal for producing an amplitude modulated pulse having an amplitude proportional to said engine torque, and a low-pass filter connected for reception of said amplitude modulated pulse for producing a DC voltage signal having a magnitude inversely proportional to said transmission output speed and further connected with said comparing means, and wherein said constant voltage converting means includes;

a voltage attenuator connected for reception of said engine torque signal for producing a constant DC voltage having a magnitude proportional to said engine torque.

4. An electronic control system according to claim 3, further comprising:

engine speed detecting means mounted for detection of a revolutional speed of the engine for generating an engine speed signal having a period proportional to an engine speed; and dividing means connected for reception of said engine speed signal and output voltage of said negative gradient voltage converting means for dividing said output voltage by said engine speed voltage and supplying the divided signal to said comparating means.

5. An electronic control system according to claim 4, wherein said dividing means includes:

a pulse shaper connected for reception of said engine speed signal for producing a shaped pulse of square wave having a period proportional to said engine speed;

a frequency divider connected for reception of said shaped pulse for producing a divided pulse having a multiplied period, and a timing-controlled integrator connected for reception of said divided pulse and amplitude modulated pulse for producing and supplying an integrated voltage to said low-pass filter.

6. An electronic control system according to claim 1, wherein said comparating means compares said output voltages of said negative gradient and constant voltage converting means and passes therethrough the higher output voltage of said two output voltages when said electrohydraulic converting means has such a negative characteristic as the pressure level of said line pressure produced therein is decreased in proportion to the increase of the level of the voltage supplied thereto.

7. An electronic control system according to claim 6, wherein said negative gradient voltage converting means includes:

a pulse shaper connected for reception of said transmission output speed signal for producing a shaped pulse of square wave having a period proportional to said transmission output speed, a pulse width modulator connected for reception of said shaped pulse and gear ratio signal for producing a width modulated pulse having a width proportional to said gear ratio, a negative inverter connected for reception of said width modulated pulse for producing an inverted pulse having a width inverted from the width of said width modulated pulse, a pulse amplitude modulator connected for reception of said inverted pulse for producing an amplitude modulated pulse having an amplitude proportional to said engine torque, and a low-pass filter connected for reception of said amplitude modulated pulse for producing a DC voltage signal having a magnitude inversely proportional to said transmission output speed, and wherein said constant voltage-converting means includes a voltage attenuator connected for reception of said engine torque signal for producing a constant DC voltage signal having a magnitude proportional to said engine torque.

8. An electronic control system according to claim 7, further comprising:

engine speed-detecting means connected for detection of a revolutional speed of the engine for generating an engine speed signal having a period proportional to an engine speed, and dividing means connected for reception of said engine speed signal and output voltage of said negative gradient voltage converting means for dividing said output voltage by said engine speed voltage and supplying the divided signal to said comparating means.

9. An electronic control system according to claim 8, wherein said dividing means includes:

a pulse shaper connected for reception of said engine speed signal for producing a shaped pulse of square wave having a period proportional to said engine speed, a frequency divider connected for reception of said shaped pulse for producing a divided pulse having a multiplied period, and a timing-controlled integrator connected for reception of said divided pulse and amplitude modulated pulse for producing and supplying an integrated voltage to said low-pass filter.

10. An electronic control system according to claim 1, wherein said comparating means includes diode means.

11. An electronic control system according to claim 1, wherein said comparating means includes an analog comparator.

12. An electronic control system according to claim 1, further comprising:

an amplifier connected for reception of said one of said two output voltages for amplifying and supplying said one output voltage to said electrohydraulic-converting means.